(12) United States Patent
Neider

(10) Patent No.: US 6,857,643 B2
(45) Date of Patent: Feb. 22, 2005

(54) ELEVATING TRAILER APPARATUS

(76) Inventor: Ken Neider, 2011 Barcelona, Chalmette, LA (US) 70043

(*) Notice: Subject to any disclaimer, the term of this patent is extended or adjusted under 35 U.S.C. 154(b) by 0 days.

(21) Appl. No.: 10/392,656

(22) Filed: Mar. 20, 2003

(65) Prior Publication Data

US 2004/0184903 A1 Sep. 23, 2004

(51) Int. Cl.[7] .............................................. B62D 21/14
(52) U.S. Cl. ................. 280/43.18; 280/683; 280/43.23; 280/6.151; 280/678; 414/482; 414/495
(58) Field of Search ................................ 414/482, 483, 414/495; 280/43.18, 683, 43.23, 678, 6.151

(56) References Cited

U.S. PATENT DOCUMENTS

| | | | | |
|---|---|---|---|---|
| 3,762,487 A | * | 10/1973 | Bilas ........................ | 180/24.09 |
| 4,047,736 A | * | 9/1977 | Prive .......................... | 280/683 |
| 4,099,740 A | * | 7/1978 | McGee ....................... | 280/678 |
| 4,252,340 A | * | 2/1981 | Egging ....................... | 280/682 |
| 4,256,326 A | * | 3/1981 | Cantrell et al. ............. | 280/683 |
| 4,504,079 A | * | 3/1985 | Strong ........................ | 280/683 |
| 4,619,578 A | * | 10/1986 | Routledge ................... | 414/498 |
| 4,706,988 A | * | 11/1987 | Young ........................ | 280/676 |
| 4,806,065 A | * | 2/1989 | Holt et al. .................. | 414/481 |
| 4,943,204 A | * | 7/1990 | Ehrlich ........................ | 414/495 |
| 5,052,713 A | * | 10/1991 | Corey et al. ................. | 280/5.5 |
| 5,667,231 A | * | 9/1997 | Dierks et al. ............. | 280/149.2 |
| 5,752,798 A | * | 5/1998 | Smidler ....................... | 414/475 |
| 5,823,558 A | * | 10/1998 | Shoquist .................. | 280/405.1 |
| 5,839,750 A | * | 11/1998 | Smith ......................... | 280/683 |
| 5,887,880 A | * | 3/1999 | Mullican et al. ......... | 280/43.18 |
| 6,155,769 A | * | 12/2000 | Robinson .................... | 414/498 |
| 6,364,340 B1 | * | 4/2002 | Taylor ........................ | 280/676 |

\* cited by examiner

Primary Examiner—Christopher P. Ellis
Assistant Examiner—Rashmi Sharma
(74) Attorney, Agent, or Firm—Keaty Professional Law Corporation

(57) ABSTRACT

An elevating trailer for moving between a low, cargo-loading position and an elevated, cargo-transporting position. The frame of the trailer has opposing sides, each side carrying a pair of tandem wheels. An inflatable air bag is mounted on a supporting and pivotal frame above the trailer side. When the bags are inflated the arms of the supporting frames are spread apart, lifting the frame. When the bags are deflated, the arms pivot toward each other, lowering the frame and facilitating loading of cargo into a container mounted on the trailer frame.

15 Claims, 6 Drawing Sheets

ELEVATING TRAILER APPARATUS

BACKGROUND OF THE INVENTION

The present invention relates to a trailer, and more particularly, to an apparatus for moving the trailer frame between a low, cargo-loading position and an elevated, cargo-transporting position.

Trailers have long been used to transport cargo, wagons, boats and other bulky, heavy objects that cannot be conventionally fitted into a transport vehicle, such as a truck. The trailers are towed by trucks by connecting the trailer hitch to an attachment ball or other such device secured on a rear of a vehicle. The wheeled trailers usually comprise an open frame supported by a tandem axle suspension system with a pair of tandem wheels on each opposite side of a trailer body.

In many situations, loading of cargo onto the elevated trailer bed becomes difficult, especially if the cargo is heavy or when livestock needs to enter the enclosure of a cargo container. In such cases, ramps and forklifts may be used to facilitate loading of the cargo. However, when a loading dock is relatively high, long ramps are needed to help load the cargo. In some locations, such facilities are not available in all places and may be limited as to the access by horses or livestock.

The present invention contemplates elimination of drawbacks associated with the prior art and provision of an elevating trailer that can move between a squatdown position and an elevated position to lower or raise the trailer frame.

SUMMARY OF THE INVENTION

It is, therefore, an object of the present invention to provide a trailer frame using tandem wheels that can be moved between a low and an elevated position.

It is another object of the present invention to provide a simple and inexpensive assembly for tandem-wheeled trailers for raising and lowering the trailer frame.

These and other objects of the present invention are achieved through a provision of a trailer that can be elevated from a normally low, cargo loading position and an elevated, cargo-transporting position. The trailer has a frame with opposing sides and a tongue for detachable securing to a tow vehicle, such as tow truck. A pair of tandem wheels is secured to each side of the frame. An inflatable air bag is mounted between each pair of the tandem wheels. Each air bag has an air conduit with a regulating valve for controlling the degree of inflation of the air bags and thereby, the height of the trailer frame from the ground.

Each air bag is supported above the trailer frame by a pair of attachment frames mounted for pivotal movement in relation to the trailer frame. When the bag is inflated the attachment frame is oriented in a generally parallel relationship in relation to the trailer frame, with the arms of the attachment frame extending at a right angle to the frame side. When the bag is deflated, the arms move towards each other, pivoting the attachment frame and allowing the trailer frame to be lowered to a squat down position.

A shock absorber is mounted between an arm of the attachment frame and the side of the frame, the shock absorber is secured to an angular bar attached to the upright arm of the attachment assembly.

BRIEF DESCRIPTION OF THE DRAWINGS

Reference will now be made to the drawings, wherein like parts are designated by like numerals, and wherein.

DETAIL DESCRIPTION OF THE PREFERRED EMBODIMENT

Figure 1:
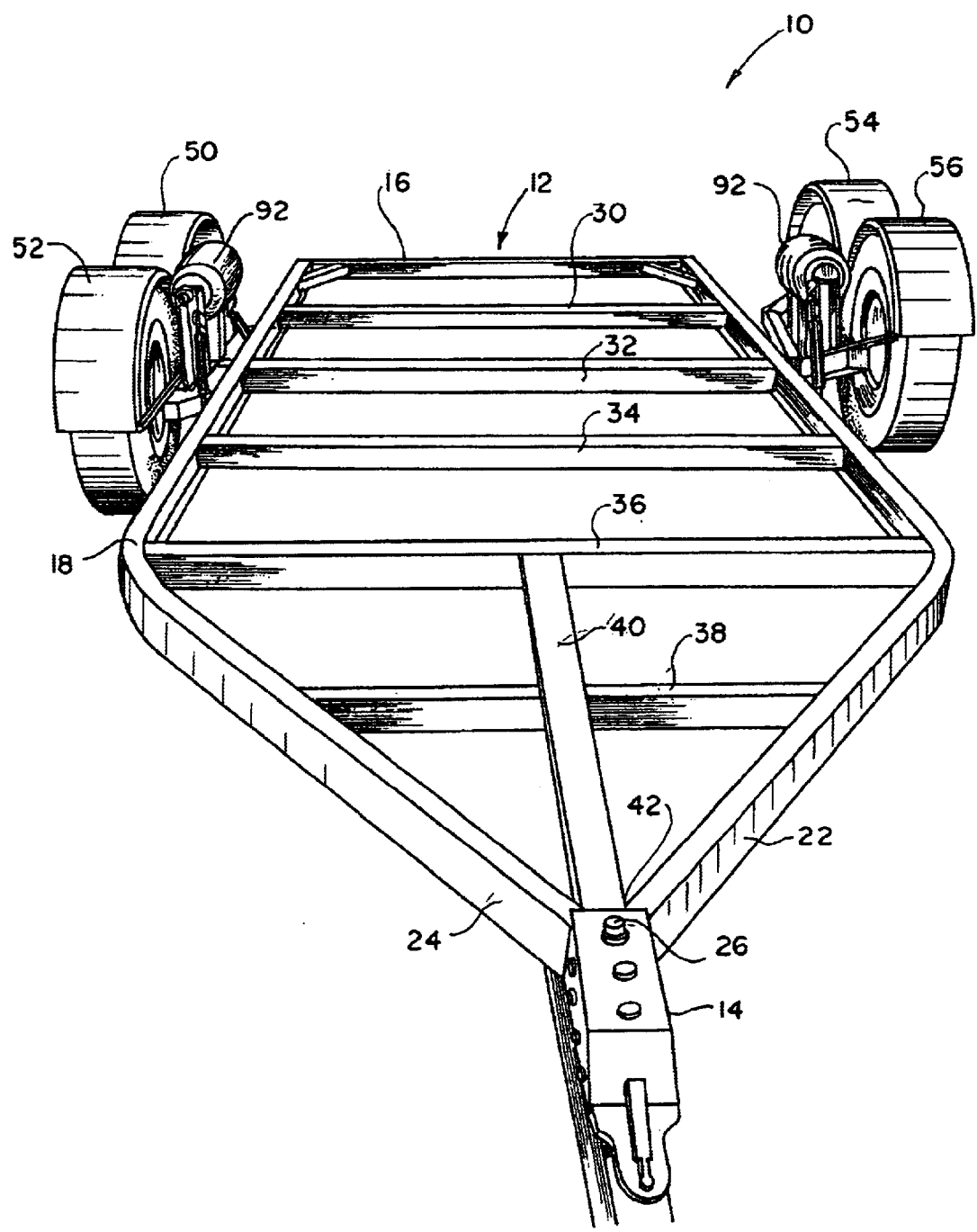
FIG. 1 is a perspective view of a wheeled trailer in accordance with the present invention.

Turning now to the drawings in more detail, numeral 10 designates the elevating trailer in accordance with the present invention. Similarly to conventional trailers, the present invention comprises an open frame structure 12 provided with a tongue 14 that, through a trailer hitch (not shown) is designed to be towed by a truck or other vehicle. The frame 12 also comprises a rear crossbar 16, a pair of parallel opposing side bars 18, 20 and a pair of diverging portions 22 and 24.

The diverging portions 22 and 24 are coupled by a pin 26, passing through the tongue 14 and allowing pivotal connection between the trailer frame per se and the tongue 14. A plurality of cross bars 30, 32, 34, and 36 extend between the opposing sides 18 and 20 in a parallel relationship to the rear cross bar 16. A shorter cross bar 38 extends between the diverging portions 22 and 24. An elongated retainer bar 40 extends from an apex 32 formed by diverging portions 22 and 24 above the bar 38 and is fixedly attached to the cross bar 36.

The frame 12 is supported on forward and rearward wheels 50, 52, 54, and 56. The wheels are arranged in pairs, such that the pair of wheels 50 and 52 are secured in tandem to the side 18, and the wheels 54 and 56 are secured in tandem to the side 20.

Figure 2:
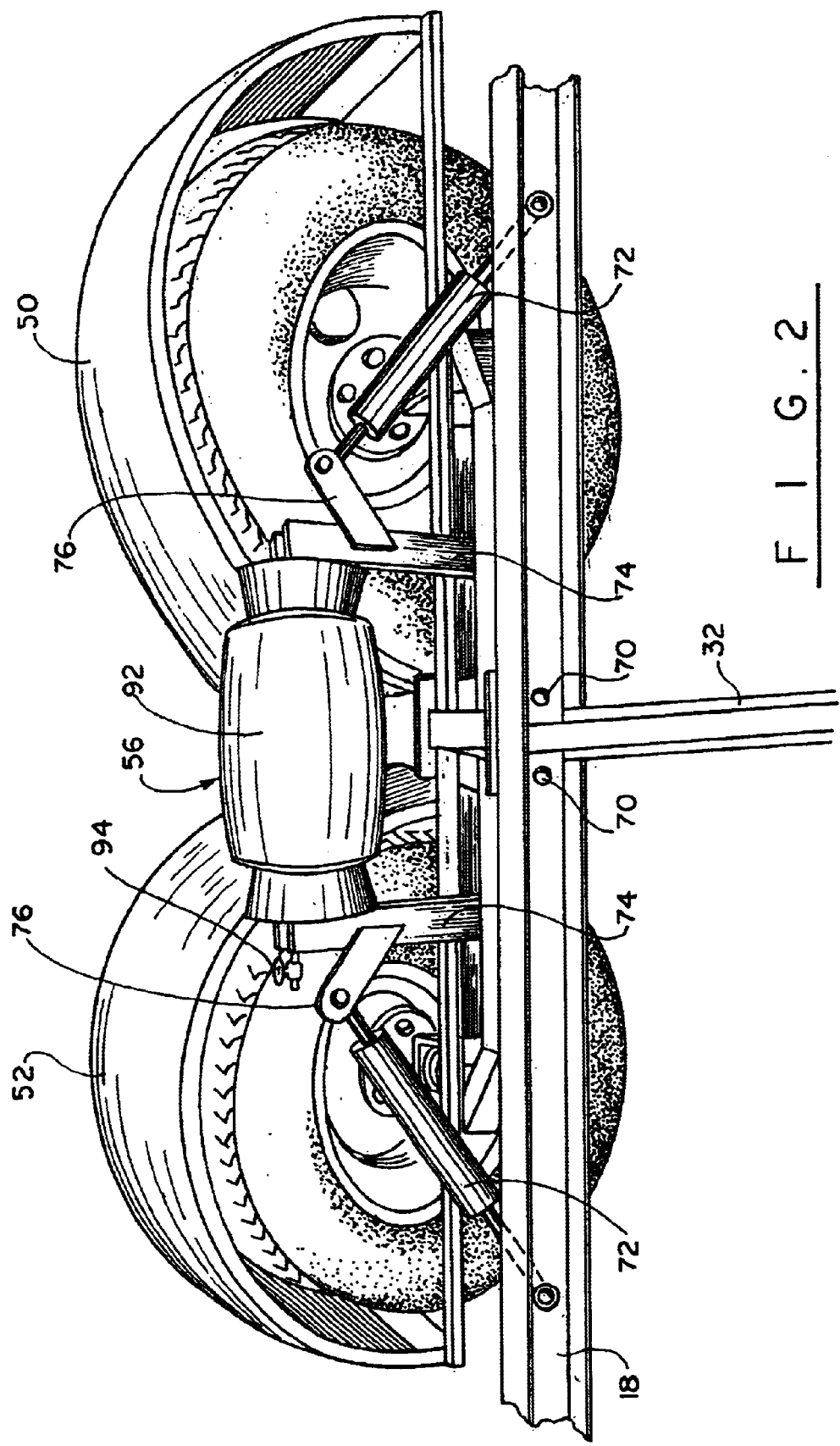
FIG. 2 is a detail perspective view showing an inflatable bag mounted between the arms of a pair of attachment assemblies.
Figure 3:
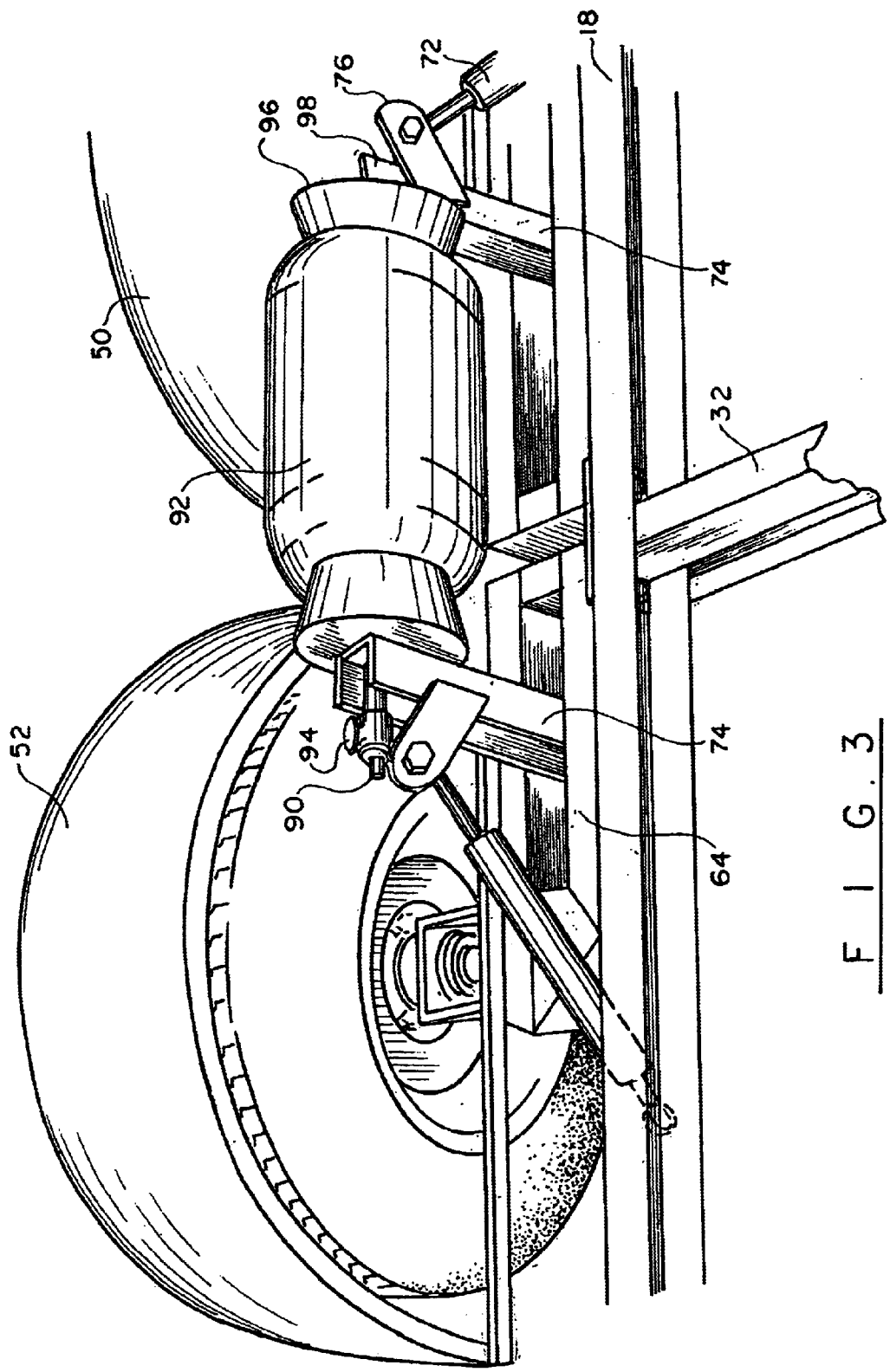
FIG. 3 is a detail perspective view showing the brackets supporting the inflatable bag between the wheels of the trailer frame.

Turning now to FIG. 2, the assembly of the elevating assembly is shown in more detail. The elevating assembly secured between the wheels 50, 52 is a mirror image of the elevating assembly secured between the wheels 54, 56. It will be understood therefore, that when describing one elevating assembly, the other elevating assembly is described, as well.

As can be seen in the drawings, the elevating assembly is fitted between the frame 12 and the axles of the wheels 50 and 52. The assembly, generally designated by numeral 56 in the drawings, comprises a pair of attachment assemblies, one assembly attachment per wheel. Each attachment assembly comprises an attachment frame 60, which is secured for pivotal movement to a side 18 or 20.

Figure 4:
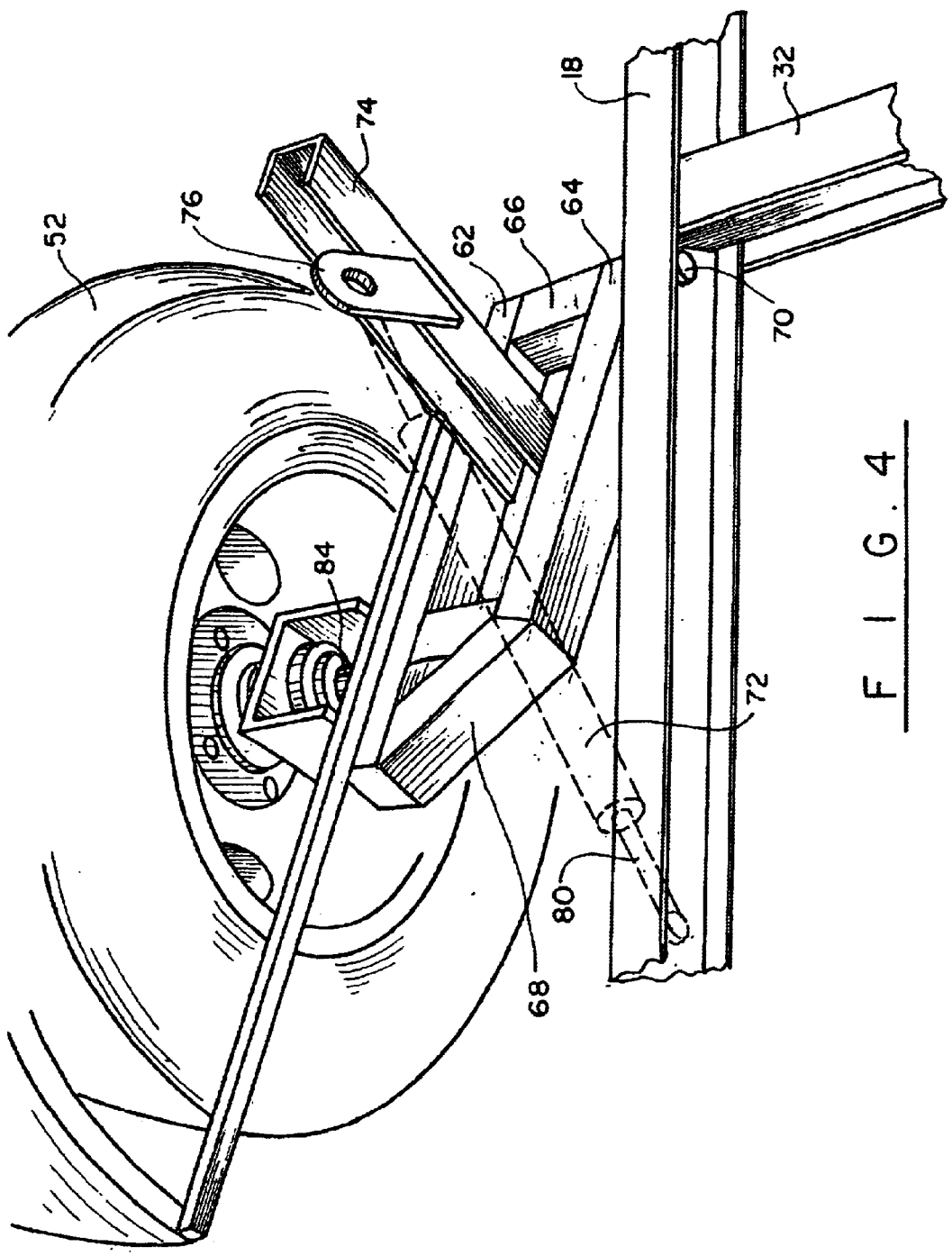
FIG. 4 is a detail view showing a bracket assembly for one of the tandem wheels of the elevating trailer of the present invention.
Figure 5:
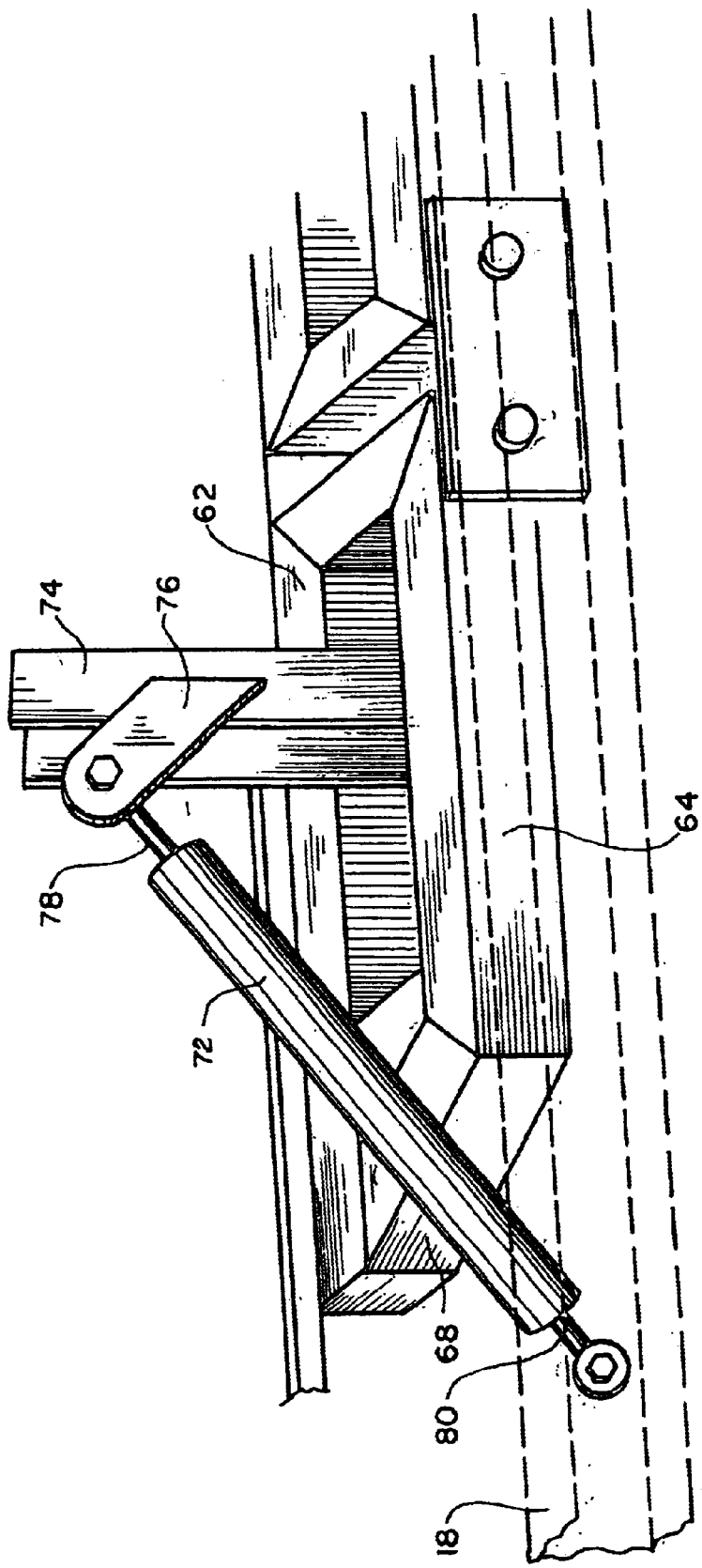
FIG. 5 is a detail perspective view showing position of the shock absorbers with an attachment assembly.

The attachment frame comprises a pair of parallel plates 62, 64, a cross plate 66, and an angular plate 68. The cross plate 66 connects proximate ends of the plates 62, 64 and receives a pivot pin 70 therethrough. The angular plate 68 connects distant ends of the elongated parallel plates 62 and 64. The angular plate 68 is oriented at an acute angle to the plate 62 and at an obtuse angle to the plate 64. As can be seen in FIGS. 4 and 5, the elongated plate 64 is shorter then the plate 62 to accommodate extension of a shock absorber 72.

Secured between the plates 62, 64 and extending at a right angle thereto, is an upright bracket, or arm 74. The arm 74 is a U-shaped bracket fixedly secured between the plates 62 and 64. A shock absorber attachment plate 76 is fixedly attached, such as by welding, to the arm 74 and extends at an angle thereto. One end 78 of a shock absorber 72 is attached to the plate 76. An opposite end 80 of the shock absorber 72 is secured to the side 18.

An axle 84 of the tandem wheel 52 is secured, through an appropriate linkage, to the plate 62. When the attachment assembly 60 moves about the axis of the pivot pin 70, the sides 18 and 20 and moved up or down, elevating and lowering the frame 12 between a cargo-transporting and cargo-loading positions.

An inflatable air bag 92 is mounted between opposing arms 74 of each side of the frame 12. The air bag is mounted above the frame 12. An air conduit 90 connects the air bag 92 to a source of compressed air (not shown). A control valve 94 is mounted in the conduit 90 to allow admission and release of a necessary quantity of air into and from the air bag 92.

Figure 6:
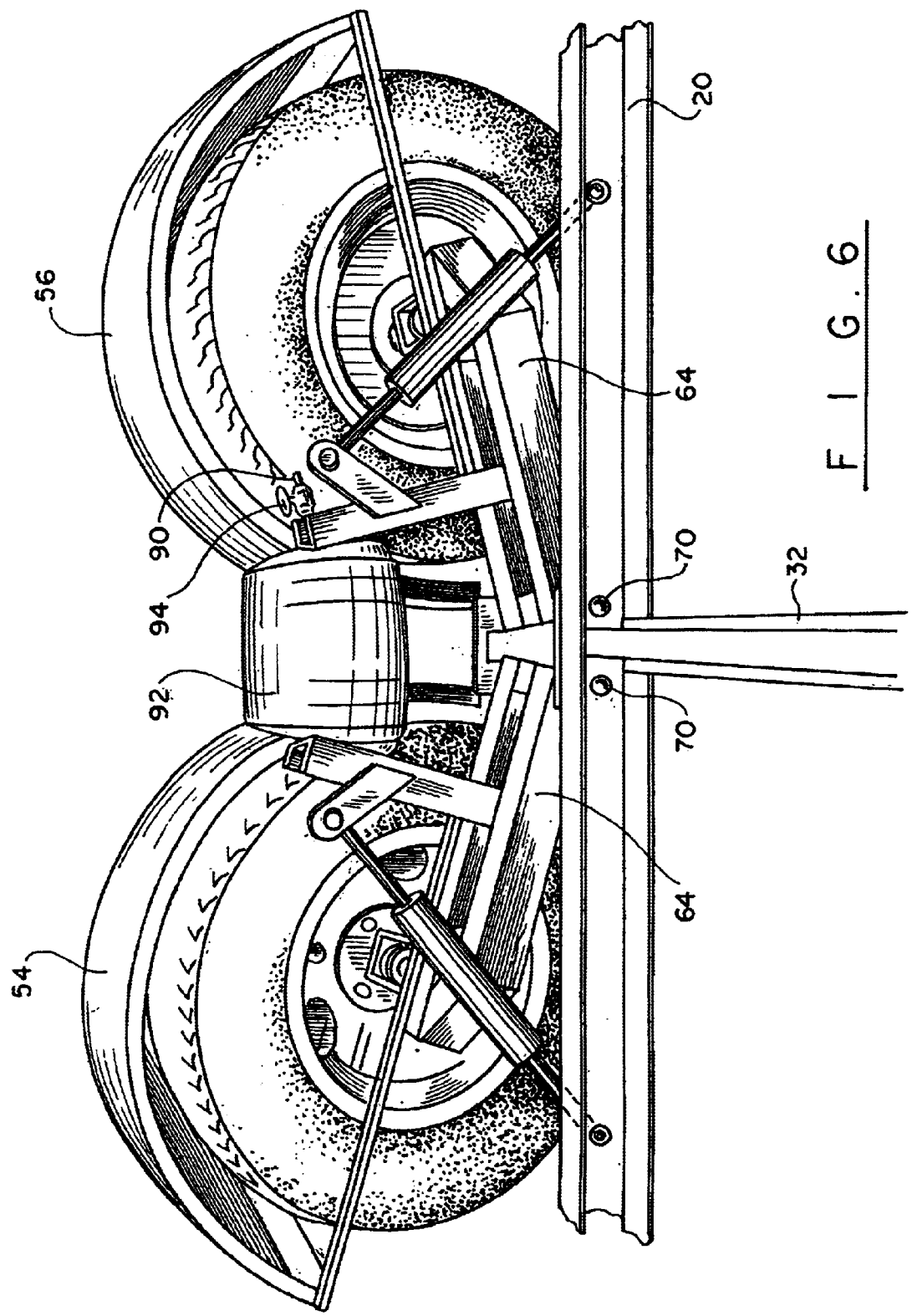
FIG. 6 is a detail perspective view of the tandem wheels with a trailer frame in a squatdown position, with the airbag deflated.

In operation, the bag 92 is normally in a deflated position shown in FIG. 6. In this position, the frame 12 is in a low, squat down position to facilitate loading of the cargo, horses, livestock, etc. As can be also seen in FIG. 6, the attachment assembly 60 pivots on the pivot pin 70 and is oriented at an acute angle in relation to longitudinal axis of the rails 18 and 20. After the loading has been completed, a user connects a source of air to a conduit 90 and admits the air into the airbag 92. The inflated airbag 92 expands pushing the arms 74 away from each other. The arms 74, being fixedly attached to the plates 62 and 64, cause the attachment assembly 60 to move about the axis of the pivot pins 70, to a position parallel with the sides 18 and 20. This position is shown in FIG. 2.

In the elevated position, the frame 12 is elevated above its normal lowered down position, making it more convenient for transportation. The inflated bag 92 retains the attachment assemblies in a parallel position in relation to the rails, retaining the frame 12 in a desired elevated position. Any incremental lowering and elevating of the frame 12 is achieved through regulating the degree of air pressure in the airbags 92. Once the trailer 10 reaches its destination, the valve 24 is activated allowing the air to be released from the airbag 92. As a result, the frame 12 is lowered again to a cargo unloading position.

During transportation, the shock absorbers 72 facilitate transportation of the container and protect the inflated bags 92 from damage that may result from the trailer 10 moving on an uneven road surface.

The size of the air bag 92 is mainly controlled by the distance between the axles of the tandem wheels. Depending on the manufacturing design, the airbag 92 can be made larger to accommodate far set wheels or can be made smaller if the distance between the axles is relatively small.

Many changes and modifications can be made in the design of the present invention without departing from the spirit thereof. I therefore pray that my rights to the present invention be limited only by the scope of the appended claims.

I claim:

1. A trailer, comprising:
    a frame having opposite sides and a pair of tandem wheels mounted on tandem axles secured on each side of the frame;
    a means for elevating the frame in relation to the wheel axles mounted above the frame, said elevating means comprising an inflatable bag retained in a normally deflated condition when the frame is in a squat down position and inflated when the frame is moved to an elevated position; and
    a pair of attachment assemblies for securing the elevating means between a pair of said wheel axles and a respective side of the frame and supporting said elevating means above the wheel axles, each of said attachment assemblies is secured in a pivotal relationship to a respective side of said frame for movement between a normally non-parallel position in relation to the side of the frame when the trailer is in a squat down position and a generally parallel position in relation to the side of the frame when the trailer is in an elevated position.

2. A trailer, comprising:
    a frame having opposite sides and a pair of tandem wheels mounted on tandem axles secured on each side of the frame;
    a means for elevating the frame in relation to the wheel axles mounted above the frame; and
    a pair of attachment assemblies for securing the elevating means between a pair of said wheel axles and a respective side of the frame and supporting said elevating means above the wheel axles each of said attachment assemblies comprises a first bar secured to a side of the frame, a second bar extending in a parallel relationship to the first bar and secured to an axle of a wheel, a pair of cross bars retaining the first bar and the second bar in a spaced-apart relationship to each other and an upright bracket secured between the first bar and the second bar.

3. The trailer of claim 2, wherein the inflatable bag is mounted between upright brackets of adjoining attachment assemblies.

4. The trailer of claim 2, wherein each of said attachment assemblies further comprises an angular bar attached to said upright bracket and extending at an angle thereto.

5. The trailer of claim 4, further comprising a pair of shock absorbers, each shock absorber secured between a respective angular bar and a side of said frame.

6. An elevating trailer, comprising:
    a frame moveable between a cargo-loading position and an elevated transport position, said frame comprising opposing sides and a pair of tandem wheels secured to each of the opposing sides of the frame;
    a means for moving the frame between the cargo-loading and the elevated positions, said moving means comprising a pair of opposed inflatable air bags secured between opposing sides of the frame and axles of said tandem wheels; and
    a means for attaching the air bags to the opposing sides and the inflatable air bags, said attaching means comprising, for each side, a pair of attachment frames secured to a respective side and a pair of upright brackets extending above the frame side, each of said attachment frames pivoting in relation to said frame side and carrying the air bag above the frame side between each pair of the upright brackets.

7. The elevating trailer of claim 6, wherein each of said attachment frames is provided with an angular bar attached to said upright bracket and extending at an angle thereto.

8. The elevating trailer of claim 7, further comprising a pair of shock absorbers, each shock absorber secured between a respective angular bar and a side of said frame.

9. The elevating trailer of claim 6, wherein each of said attachment frames is secured in a pivotal relationship to a respective frame side for movement between a normally non-parallel position in relation to the side of the frame when the trailer is in a cargo-loading position and a generally parallel position in relation to the side of the frame when the trailer frame is elevated for a transport position.

10. The elevating trailer of claim 6, wherein each of said attachment frames comprises a first bar secured to a side of the frame, a second bar extending in a parallel relationship to the first bar and secured to an axle of a wheel, a pair of cross bars retaining the first bar and the second bar in a spaced-apart relationship to each other, and wherein an upright bracket is secured between the first bar and the second bar.

11. The elevating trailer of claim 6, wherein each of said inflatable bags is provided with a gas conduit for admitting compressed air into the interior of the inflatable bag.

12. The elevating trailer of claim 11, wherein said gas conduit is provided with a control valve for regulating amount of air admitted into the inflatable bag, thereby regulating the degree of elevation of the frame in relation to the ground.

13. An elevating trailer, comprising:
   a frame moveable between a cargo-loading position and an elevated transport position, said frame comprising opposing sides and a pair of tandem wheels secured to each of the opposing sides of the frame;
   a means for moving the frame between the cargo-loading and the elevated positions, said moving means comprising a pair of opposed inflatable air bags secured between opposing sides of the frame and axles of said tandem wheels, each of said air bags being provided with a conduit for admitting and releasing compressed air and a control valve mounted in the conduit for regulating the amount of air in the air bag;
   a means for attaching the air bags to the opposing sides and the inflatable air bags, said attaching means comprising, for each side, a pair of attachment frames secured to a respective side and a pair of upright arms extending above the frame side, each of said attachment frames pivoting in relation to said frame side and can-ying the air bag above the frame side between each pair of the upright arms; and
   a shock absorber secured between each of said upright arms and a respective side of the trailer frame.

14. The elevating trailer of claim 13, wherein each of said attachment frames comprises a first bar secured to a side of the frame, a second bar extending in a parallel relationship to the first bar and secured to an axle of a wheel, a pair of cross bars retaining the first bar and the second bar in a spaced-apart relationship to each other, and wherein the upright arm is secured between the first bar and the second bar.

15. The elevating trailer of claim 14, wherein each of said attachment frames is provided with an angular bar attached to said upright arm and extending at an angle thereto, and wherein one end of the shock absorber is secured to said angular bar, with a second end of the shock absorber being secured to a frame side.

* * * * *